Jan. 21, 1930.   A. B. SHAW   1,744,338
TIRE VALVE
Filed Sept. 7, 1926
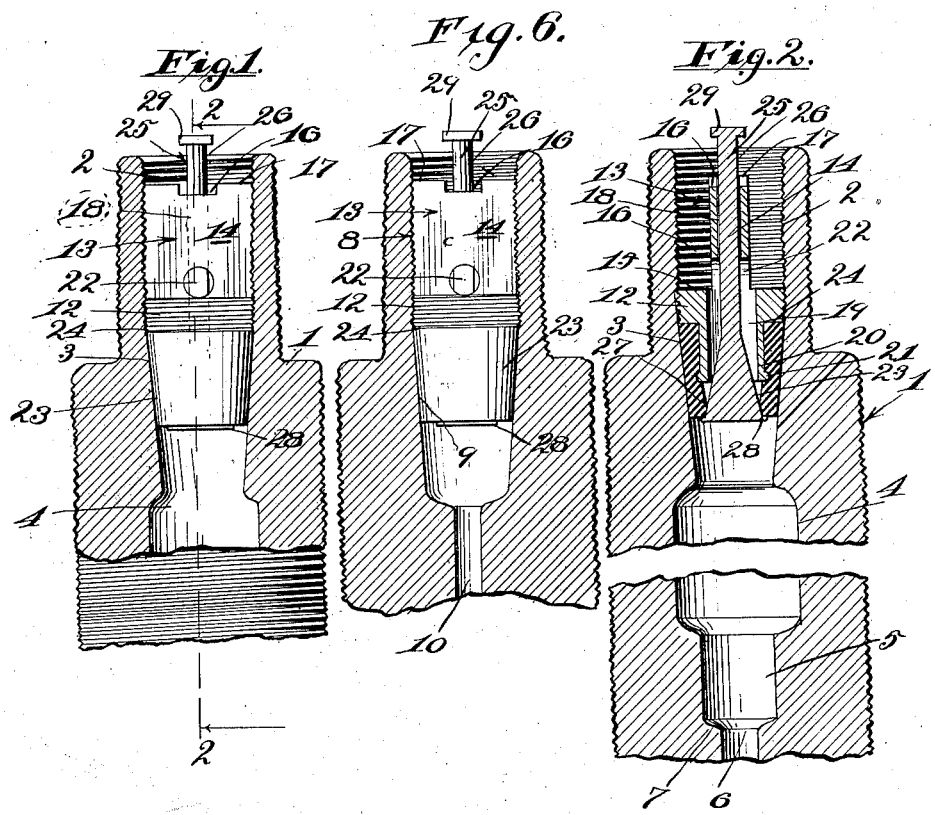
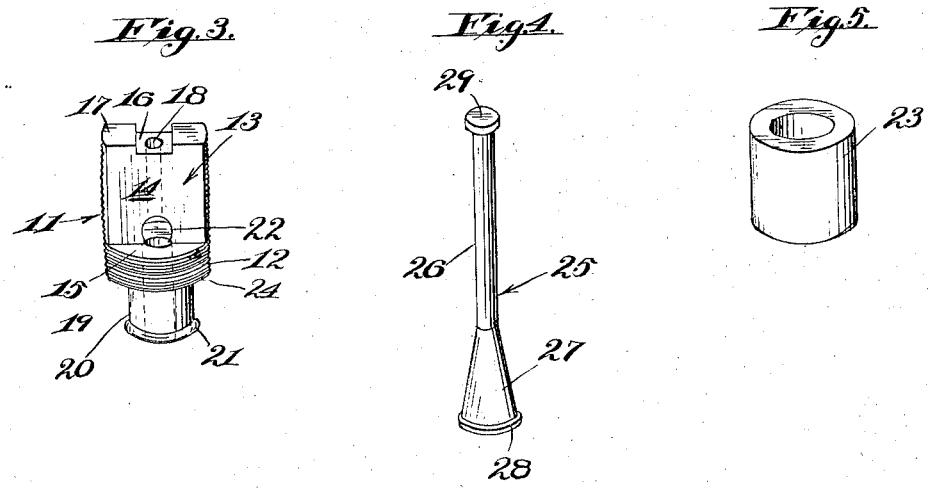
Inventor
A. B. Shaw,
by Hazard and Miller
Attorneys.

Patented Jan. 21, 1930

1,744,338

UNITED STATES PATENT OFFICE

AI B. SHAW, OF SANTA MONICA, CALIFORNIA, ASSIGNOR, BY DIRECT AND MESNE ASSIGNMENTS, TO DOROTHY M. STOREY, DONALD E. STOREY, AND ELEANOR M. STOREY, ALL OF SANTA MONICA, CALIFORNIA, AND SHERMAN E. KNAPP AND JOSEPHINE G. WHITTEMORE, TRUSTEES

TIRE VALVE

Application filed September 7, 1926. Serial No. 133,890.

My invention is a tire valve for pneumatic tires, to allow filling of same and retaining the air under pressure in the tires.

An object of my invention is the construction of so-called tire valve "insides" to be fitted in a valve stem and be composed of a small number of parts which give an efficient air seal and which are not subjected to wear unless under pressure of the air in the tire.

Another object of my invention is in connection with a valve stem which is connected to a tire to have an inwardly tapering surface, into which a cylindrical rubber tube may be forced by means of a core, thus compressing the tube at its lower ends. In co-operation with the rubber tube, to have a spindle slidably mounted in the core, this spindle having a conical-shaped valve end tapering in an opposite direction to that of the inside of the stem so that solely through the medium of the air pressure in the tire the spindle is forced outwardly and the conical-shaped valve element compresses the rubber tube laterally against the inside surface of the stem, and thus, without substantially upsetting or thickening of the rubber tube, thereby forming an air tight seal. In such construction, the core and the tube allow a passage of air into and out of the tire when desired.

Another object of my invention is the construction of the inside valve mechanism to fit a standard valve stem such as a Schrader stem and to have a large bearing surface for receiving the valve between a metal structure and a rubber element co-acting therewith.

Another object of my invention is the elimination of a spring to maintain the valve elements in contact. In the construction of one of the standard tire valves now on the market a rubber gasket by means of a suitable nut is screw threaded internally into a valve stem and forms a seat against the inside of the stem making an airtight closure, there being a central passage through the rubber through which extends a stem. A stationary circular metal valve seat is positioned between the rubber packing and its edge and is almost of knife like thinness. This thin edge seats on a very small rubber ring, which by spring pressure is pressed upwardly against the metal valve seat. This coil spring exerts a constant pressure of the rubber ring against the circular knife-like edge and when the tire is under air pressure this pressure is increased.

In the standard inside fitting above mentioned the spring is seated against shoulders on the inside of the valve stem. The rubber ring and the cup in which it is secured are rigidly connected to a valve spindle. With this construction of valve it is necessary that the metal circular valve seat have comparatively sharp edges to imbed in the rubber to make an air-tight seal. This action therefore rapidly destroys the small rubber ring rendering the valve inoperative. Moreover, in this well known type of valve, the valve spindle is loose in the upper nut which screws into the valve stem and therefore this spindle is always loose and has a lateral vibration which causes leakage.

In my construction I utilize a core or body which is externally threaded to fit in the standard valve stem, this core being cut away or flattened at the upper opposite sides and has a neck with a bead on the end extending downwardly from the core or body portion. A small bore hole extends downwardly through the core or body at the flattened section and joins a larger bore extending through the neck, there being a transverse opening into the large bore from the flattened sides. A spindle is fitted through the small and large bores which are in alinement, and in the small bore makes a close fit insufficient to pass air freely. The lower end of the spindle is tapered with the large end of the taper at the end of the spindle. The upper end of the spindle is upset to retain same in the core or body.

A short rubber tube is stretched over the neck, being held by the bead and when the body or core is screwed into the valve stem this tube is compressed its entire length, and forms an internal seat for the slidable valve structure on the spindle, this being the tapered lower part of the spindle with the enlarged head on same.

My invention in its several aspects will be apparent from the following description and drawings, in which;

Figure 1 is a vertical section through a standard valve stem, showing my internal valve mechanism in elevation;

Fig. 2 is a vertical section on the line 2—2 of Fig. 1, taken in the direction of the arrows;

Fig. 3 is a perspective view of the core or body of the valve structure;

Fig. 4 is a perspective view of the spindle removed from the core or body;

Fig. 5 is a perspective view of the rubber tube or valve seat element;

Fig. 6 is a vertical section through a valve stem especially designed for my valve mechanism, illustrating the valve mechanism in elevation.

Referring to the construction shown in Figs. 1 to 5, a standard type of valve stem is designated by the numeral 1, this illustrating only part of the stem indicating the straight internally threaded upper portion 2, the inclined taper 3, this being a smooth surface and the internal bore 4 in which the standard valve insides now fit.

The portion 4 in the standard valve stem is of larger diameter than the smallest part of the taper 3, there being a lower smaller section 5 and an air duct 6 and shoulders 7 at the junction portion against which the spring of a standard valve insides fits. It will be noted by reference to Fig. 8 that my valve stem merely has the upper internally threaded portion 8, the downwardly tapered portion 9 and the air duct 10 extending through the stem to the tire.

The valve core of body is constructed substantially as follows and is designated generally by the numeral 11;

This has a lower cylindrical portion 12 and a central section 13 with opposite flat sides 14. The top of the body portion has a flat surface 15 joining the surfaces 14 at right angles. This construction is made by cutting out a section 16 of a cylindrical body, leaving the flat surfaces 14 and 15. A recess 16 is formed in the end 17 of the central section 13 and there is a small bore 18 extending axially through the reduced section 13. This is joined by a large bore 19 which extends down through a neck 20 formed integral with the body and extending below same, there being a bead 21 on the end of the neck section. A transverse hole or opening 22, preferably formed by drilling a hole from side to side of the flat portion between the walls 14 forms an air passage to the enlarged bore 19.

The valve seat structure is formed by a rubber cylinder 23 which is designed to be drawn tightly over the neck 20, a bead 21 imbedding itself into the rubber. The diameter of the rubber is the same as that of the core or body, the upper end bearing against the circular shoulder 24 on the body portion 12 adjacent the neck 20.

A spindle designated generally by the numeral 25 has a cylindrical portion 26 which has a sliding fit in the bore 18, this fit being insufficient to allow free passage of air. At the lower end there is a tapered valve portion 27 with a slightly enlarged head 28 thereon. There is an upset end 29 on the opposite end of the stem, this being formed after assembly in the body or core.

The body or core is screw threaded, these threads being continued on the edge of the flattened part 13 of the core or body. This allows the valve mechanism to be screw threaded in the valve stem by utilizing valve tools now on the market. The ruber tube 23 is seated against the tapered part 3 of the valve stem and becomes compressed its entire length. The spindle 25 is free to slide through the body or core and is guided concentric with same by means of the close sliding fit with the bore 18.

When air is blown into a tire, the end of the stem is connected to a suitable connecting appliance and the air under pressure blows the valve stem inwardly, the air passing along the flat sides of the upper portion of the core or body through the transverse opening 22 and through the large bore 19, thence through the central bore or air duct in the valve stem to the tire. When the tire is inflated the internal pressure forces the spindle outwardly, thereby pressing the conical surface 27 of the spindle against the inwardly pressed rubber tube 23 forming an air tight seal, and in some cases when the pressure is considerable the spindle is forced outwardly until the head 28 engages with the inner end of the rubber tube as shown in Fig. 2, thereby limiting the travel of the spindle. When it is desired to deflate the tire it is only necessary to press on the upset end 29 of the spindle, forcing same inwardly and allowing the air to pass out between the spindle and the inner walls of the rubber tube.

From this construction it will be seen that I have developed a simple type of tire valve which only requires three elements, these being the body or core, the slidable spindle and the rubber tube forming the valve seat. The area against which the tapered part of the spindle bears on the rubber is of considerable extent and the more the rubber tube is compressed by the tapered bores 3 the greater is this bearing area, giving an effective seal. Moreover, even if the rubber wears against the conical surface 27 of the spindle, there is a considerable body of rubber to be worn away before the valve becomes ineffective. Moreover, the head 28 will be forced against the end of the rubber tube 23 when such tube becomes worn or the pressure is excessive, thereby giving a second type of air-tight seal.

It will be seen by reference to Fig. 6 that I have also simplified the construction of the valve stem as internally this only requires a straight thread at the top, a tapered surface and then a straight bore leading to the tire, thereby reducing the cost of manufacture of the valve stems.

It will thus be seen that on account of my simplified valve "insides" and the simplified construction of the valve stem, that I have developed a complete tire valve which is effective and gives a longer life to the internal parts of the valve, the whole construction being much cheaper to manufacture than the standard valve construction now on the market.

Although my invention is of a simple character, it is nevertheless apparent that it may be considerably modified in general construction or in specific details. Such changes will be within the spirit of my invention as set forth in the description, drawings and claims.

It will be noted particularly by reference to Fig. 2 that the rubber tube 23 has a square abutment against the main portion of the core and has a tight engagement on the neck portion, thereby forming an airtight seal so far as the core is concerned. It is also compressed against the tapered part of the stem and forms a seal against the stem preventing air leaking outwardly. It will also be noted that the rubber tube is compressed slightly or contracted at its lower end beyond the neck of the core and this extension is the part engaged by the tapered end of the spindle internally, thus forming an internal seal in the tube and preventing air from leaking past. The action of the spindle being pressed outwardly by the internal pressure of the air is to compress the inner portion of the rubber tube against the tapered portion of the stem between the conical portion of the spindle and the inner wall of the stem.

It is to be noted as a characteristic feature of my invention that the rubber tube extends downwardly beyond the end of the neck of the core and is fitted and compressed against the downwardly tapered part of the stem 1. The tapered part 27 of the spindle engages the lower internal part of the rubber tube and compresses this laterally against the tapered part of the stem. In practice the tapered part 27 does not engage the neck nor does the enlarged head 28 engage the lower part of the rubber tube, but the air seal is entirely caused by the tapered part 27 pressing outwardly on the tube and the tube being pressed against the internal downwardly tapered part of the stem without substantial longitudinal upsetting or thickening of the rubber tube.

It is also to be noted that the small bore through the central part of the core gives a long bearing for the cylindrical part of the spindle and properly centers the tapered part 27. The head 29 may fit the recess 16, as shown in Figs. 1, 2, 3 and 6, and the recess 30 may accommodate the spring 32 when this is used.

Having described my invention, what I claim is:

1. In a tire valve, a casing provided with a valve chamber having an internal, conical seat portion and a coaxial threaded portion, a rubber packing tube whose outside diameter, when free is greater than said seat portion, a valve movably disposed in the tube and having a cone part extending inside the tube, and means engaging said threaded portion for forcing the tube into place in said conical seat and thereby compacting the inner end of the tube; said valve cone being closeable by air pressure against the initially compacted tube and further compressing it.

2. In an air valve for tire tubes, a casing provided with a conical, inner seat and a rubber packing tube whose inner valve receiving end is inwardly, radially compacted and constantly externally buttressed by the conical seat, and a valve movable in the tube and having a conical part to engage and seat on said compacted end of the packing tube.

3. In an air valve for tire tubes, an "insides" casing having a threaded bore and below it an elongated conical bore forming a convergent seat, an "insides" body carrying a central, movable valve having a tapered, closing end, and a rubber packing tube buttressed throughout its length on said conical seat and inwardly compacted thereby when the said body is screwed home.

In testimony whereof I have signed my name to this specification.

AI B. SHAW.